United States Patent Office 2,757,192
Patented July 31, 1956

2,757,192

UNSATURATED DIFUNCTIONAL COMPOUNDS
AND PROCESS FOR THEIR PREPARATION

Edward L. Jenner, Wilmington, Del., assignor to E. I. du Pont de Nemours and Company, Wilmington, Del., a corporation of Delaware No Drawing. Application May 20, 1952,
Serial No. 289,003

10 Claims. (Cl. 260—465.3)

This invention relates to a new process for the additive coupling of ethylenically unsaturated compounds, such coupled products including difunctional compounds. It also relates to certain new difunctional compounds prepared by such process.

This application is a continuation-in-part of my copending application Serial No. 212,197, filed February 21, 1951, now abandoned.

The importance of difunctional compounds for use in the preparation and modification of polymers has been recognized in recent years. For example, numerous exceedingly useful polyamides and polyesters have been prepared from dibasic acids, dihydric alcohols, diamines, and the like. Difunctional compounds having different functional groups have also found useful application in the preparation of polymers. Difunctional hydroxy, carboxy, and carbonyl compounds have been of considerable utility in the modification of polymers, for example, when employed in polymer plasticizers. A new process for the production of difunctional products of ethylenically unsaturated compounds whereby many new, as well as previously known, difunctional compounds are produced would obviously be of considerable importance.

It is an object of this invention to provide a new and improved process for the coupling of ethylenically unsaturated compounds.

It is another object of this invention to provide a new and improved process for the coupling of ethylenically unsaturated compounds to produce a variety of useful products of such compounds, including difunctional compounds.

It is another object of this invention to provide a new and improved process for the coupling of ethylenically unsaturated compounds having a conjugated unsaturation.

It is still another object of this invention to provide a new and improved process for the coupling of 1,3-butadiene.

It is a more specific object of this invention to produce certain new diketones.

Other objects of this invention will appear hereinafter.

The objects of this invention may be accomplished, in general, by reacting a polymerizable ethylenically unsaturated compound with hydroxyl free-radical, i. e., hydroxyl radical in its free form, in molar ratios of said unsaturated compound to hydroxyl radical of between 1:1.5 and 5:1 in the presence of a reactive organic solvent that is a saturated monofunctional compound containing, as the functional group, a carbonyl, cyano, carboxyl, carbonamide, or amino group.

The hydroxyl free-radical (test for which see Stein and Weiss, "Nature" 166, 1104–5 (1950)) employed in the reaction of this invention is suitably provided by generating it from an inorganic peroxide that will yeld hydrogen peroxide under acidic conditions or from hydrogen peroxide itself and a reducing agent such as an inorganic salt having oxidizable ions of a metal of series 4 of the periodic table and of atomic number 22 to 26, for example, a substance yielding ferrous, titanous, or vanadous ions. An alternative method for furnishing hydroxyl free-radicals is by employing radiant energy or nuclear radiation on hydrogen peroxide or water. A further method is by the use of oxygen with ferrous (+2) or cerous (+3) ions. To obtain efficient use of the hydroxyl free-radicals, it is desirable that their relative concentration in the reaction mixture be low at any time in view of their high activity and short life. Accordingly, the aqueous solutions containing the peroxide and the reducing agent, that is, oxidizable ions, are preferably added gradually and mixed in the reaction mixture in the presence of the alcohol and unsaturated compound. The total amount of hydroxyl free-radicals supplied to the reaction mixture may vary between wide limits, preferably, however, they should be supplied in molar ratios of said unsaturated compound to hydroxyl radical of between 1:1.5 and 5:1.

The reactive organic solvents to be used in accordance with this invention enter into the reaction with the hydroxyl free-radical and the polymerizable ethylenically unsaturated compound. Suitable organic solvents are those aliphatic compounds which have at least two carbon atoms and generally less than six carbon atoms and are free from carbon-to-carbon unsaturation. They are compounds containing, as the functional group, a cyano, carboxyl, carbonamide, amino, or carbonyl group. As representative examples of such solvents the following are named, butylamine, amylamine, butyronitrile, butyric acid, glutaric acid, propionamide; ketones such as cyclohexanone, methyl ethyl ketone, diethyl ketone; and aldehydes such as butyraldehyde. These solvents are soluble in water in an amount of at least one-tenth of one percent (0.1%) and preferably three percent or more, and generally more than five percent. These organic solvents are present in the reaction mass in at least equivalent quantities by weight to the ethylenically unsaturated compound and may be present in an excess of up to ten times or even up to one hundred times the weight of the ethylenically unsaturated compounds.

In the practice of this invention any ethylenically unsaturated compound subject to addition polymerization may be employed and preferably those containing not more than ten carbon atoms. Particularly useful are the ethylenically unsaturated compounds of two to eight carbon atoms, preferably those having conjugated unsaturation, and particularly those having two ethylenic double bonds in a conjugated system, including styrene, 1,3-butadiene or 2-chloro-1,3-butadiene. In general, the diene hydrocarbons of four to five carbon atoms, e. g., butadiene and isoprene, are most useful.

The amount of water present in the reaction mixture should not exceed one hundred times the weight of the organic compounds present. When larger amounts of water are present, the concentration of organic compound is low and the yield of difunctional compound is decreased. Preferably, weight ratios of water to organic compounds of less than 30:1 and generally less than 10:1 are used. The optimum amount of water to be used is dependent upon the specific reactants employed. When a highly water-soluble organic system is employed, the amount of water can be reduced to 1:1 or even as low as 0.1 to 1.0.

The aqueous reaction mixture is preferably acidic, e. g., the pH of the reaction media is generally below 7.0 and in some cases below 2.0.

The reaction time is not critical but generally requires at least fifteen minutes for the addition of the hydroxyl free-radical generating solution to the organic compound. Suitable temperatures for the reaction vary from −30° C. to 60° C., with the preferred temperature dependent upon the particular system used.

The coupled products and particularly the difunctional products are isolated by any suitable technique depending upon the properties of the substances obtained. In general, the isolation involves extraction of a product from the water and inorganic materials. Distillation, crystallization or precipitation may be employed in the isolation and purification of the products obtained. The coupled products obtained can be represented by the general formula X—M—M—Y wherein M is the unit of a polymerizable ethylenically unsaturated monomer and X and Y are groups derived from the solvent or peroxide, e. g., —CH₂CN, —CH₂COCH₃, —OH, —OOH, —CH₂COOH, etc.

The products obtained by the process of this invention may be used in the preparation of polymers, particularly the difunctional products. These products may also be used in the preparation of and modification of polymer plasticizers, or as intermediates for the preparation of other organic compounds.

The process of this invention provides a method for the preparation of certain new compounds. The new products obtained by the reaction of 1,3-butadiene with esocyclic monoketones having five to six atoms in the ring, are of utility, e. g., as plasticizers for vinyl polymers or for preparation of their carbonyl derivatives, e. g., by reductive amination to give diamines. These products have the general formula

R—(C₄H₆)—(C₄H₆)—R wherein R is a monovalent radical of an esocyclic ketone having five to six atoms in the ring and wherein the C₄H₆ unit is

—CH₂—CH=CH—CH₂— or

—CH₂—CH(CH=CH₂)—

The esocyclic ketone employed is preferably hydrocarbon except for the keto group. Preferably five to six carbons are present in the radical, e. g., as in cyclopentanone (see Example VI below), cyclohexanone (see Example VII below), or as in methyl cyclohexanone.

The following examples are given to illustrate, in detail, the practice of the process of this invention.

*Example I*

To a solution of 475 parts of acetone in 150 parts of water, there was added simultaneously and equivalently 130 parts of 1,3-butadiene, a solution of 41 parts of hydrogen peroxide in 96 parts of water, and a solution of 334 parts of ferrous sulfate heptahydrate and 118 parts of sulfuric acid in 1000 parts of water. The mixture was agitated during the addition of the reactants and held at a temperature of $-5°$ C. during the sixty minutes required for the addition. At the end of the addition period, the two phases present were separated and the aqueous phase was extracted four times with ether. Sodium bicarbonate was added to the combined organic layers to neutralize any acids present, and the extracts were dried over magnesium sulfate. After the distillation of the ether and acetone at atmospheric pressure, the product was distilled under reduced pressure through a 24-inch Vigreux column. The following fractions were obtained:

| Fraction | Weight (Parts) | Boiling Point, °C. | $n_D^{25}$ |
|---|---|---|---|
| 1 | 7.5 | 33–34°/26 mm | 1.3921 |
| 2 | 3.8 | 47–61°/26 mm | 1.4291 |
| 3 | 6.1 | 63–67°/26 mm | 1.4321 |
| 4 | 8.5 | 44–46°/4.5 mm | 1.4351 |
| 5 | 4.2 | 46°/4.5 mm | 1.4365 |
| 6 | 3.6 | 78–89°/4.5 mm | 1.4551 |
| 7 | 4.4 | 88–89°/4.5 mm | 1.4589 |
| 8 | 3.3 | 74–79°/1.5 mm | 1.4571 |
| 9 | 4.3 | 80–82°/1.5 mm | 1.4549 |
| 10 | 4.7 | 87–89°/1.5 mm | 1.4561 |
| 11 | 3.3 | 88–101°/0.3 mm | 1.4630 |
| 12 | 2.9 | 100–111°/0.3 mm | 1.4742 |
| 13 | 1.0 | 110–120°/0.3 mm | 1.4735 |
| Residue | 3.0 | | |

These fractions were characterized as follows: Fraction 1 was shown to be principally acetic acid (identified by use of Duclaux numbers). Fraction 2 was principally hydrocarbon and not further characterized. Fraction 3 was a hydrocarbon (probably 3-ethyl-1,5-octadiene). Its boiling point, index of refraction and density checked with those of known branched-chain 10-carbon diolefins. Its infrared spectrum showed that the unsaturation was half internal and half terminal (i. e., vinyl). Fraction 4 was identified as 3,7-decadiene. Preliminary indentification was by boiling point, density, carbon and hydrogen analyses, and refractive index. The infrared spectrum showed no terminal unsaturation. The material absorbed the calculated amount of bromine to yield the known crystalline tetrabromide. The compound, 3,7-decadiene, reacts with dithiols to give polymers which can be heat-molded in the form of useful objects such as buttons. Alternatively, it can be converted to a diepoxide which is of utility in polymer modification, for example, the insolubilization of a wide variety of known polymers, particularly those used in coating applications. Fraction 5 was also a hydrocarbon and yielded the same crystalline tetrabromide as was obtained from fraction 4. Fraction 6 was a 9-carbon, doubly-unsaturated primary alcohol since analysis showed the presence of a hydroxyl group and the absence of carbonyl groups. Hydrogenation showed two double bonds per molecule. The saturated alcohol obtained by hydrogenation reacted with 3,5-dinitrobenzoyl chloride, but did not yield a crystalline derivative. The boiling point of the alcohol corresponds to that of a normal C₉ alcohol. The hydrogenated 9-carbon alcohol is useful as a plasticizer in a wide variety of polymers including cellulose derivatives such as cellulose acetate and in perfume formulations. Fractions 7 and 8 were mixtures of oxygenated compounds containing both hydroxyl and carbonyl groups. Fractions 9 and 10 were ketones, probably methyl decadienyl ketone. The characterization is based on carbon and hydrogen analysis, quantitative hydrogenation, carbonyl equivalent, and the formation of the dinitrophenylhydrazone of the saturated ketone obtained by hydrogenation. The latter was analyzed. Fractions 12 and 13 were high boiling materials containing two oxygens per molecule. The oxygens were present in both carbonyl and hydroxyl groups. Quantitative hydrogenation showed two double bonds per molecule. These data indicate that the higher fractions are mixtures of doubly-unsaturated glycols, diketones, and ketoalcohols.

The above example indicates that the hydroxyl radicals generated from the ferrous sulfate-hydrogen peroxide combination react with acetone in two ways: (A) A fission reaction giving acetic acid and methyl radicals, and (B) hydrogen abstraction giving water and acetonyl radicals. The butadiene may be attacked by either hydroxyl radicals or the derived methyl or acetonyl radicals. Under the reaction conditions, the intermediate free radical (RCH₂CH=CHCH₂· where R is hydroxyl, methyl, or acetonyl) thus formed, coupled or dimerized, yielding products containing two butadiene residues.

*Example II*

To a solution of 520 parts of acetic acid in 100 parts of water there were added simultaneously and equivalently 130 parts of 1,3-butadiene, a solution of 41 parts of hydrogen peroxide in 96 parts of water, and a solution of 334 parts of ferrous sulfate heptahydrate and 118 parts of sulfuric acid in 1000 parts of water. The mixture was agitated and held at a temperature of $-5°$ C. during the forty-five minutes required for the addition. The reaction mixture was extracted six times with ether and the extract was dried over magnesium sulfate. After the distillation of the ether, two parts of sodium acetate was added to the pot before distillation of the product. A fraction (2.8 parts) was obtained, B. P. 105°–110° C./2 mm. The distillation residue, which consisted of 39 parts, was dissolved in ether, washed repeatedly with water, and then the ether was distilled and completely removed by heating in vacuo. The analysis of this material (the non-volatile residue) corresponded approximately to that of a partially esterified 10-carbon hydroxy-acid. Conversion of this product to the cyclic ester gives a product of particular use in perfume applications. A portion of the material was dissolved in ether and the alkali-soluble material then extracted with aqueous sodium hydroxide. The aqueous solution was then subjected to hydrogenation to reduce the ethylenic double bonds. The solution was acidified and the organic acid extracted with ether. The acid thus obtained was esterified by heating it with ethanol in the presence of sulfuric acid, and the resulting ethyl ester was distilled, boiling point 150°–180° C./3 mm. The analysis of the distillate corresponds to that of the ethyl ester of a 10-carbon saturated hydroxy acid.

*Analysis.*—Calc'd. for $C_{12}H_{24}O_3$: C, 66.63; H, 11.18; sap. eq., 216.3; hydroxyl eq., 216.3. Found: C, 67.09; H, 10.43; sap. eq., 220; hydroxyl eq., 235.

Example III

To a mixture of 100 parts of water and 272 parts acetonitrile there were added simultaneously and equivalently 108 parts 1,3-butadiene, a solution of 34 parts hydrogen peroxide in 78 parts water, and a solution of 278 parts ferrous sulfate heptahydrate and 98 parts sulfuric acid in 310 parts water. The mixture was agitated and held at −5° C. during the twenty-five minutes required for the addition. At the end of the reaction, the organic layer was separated and the aqueous layer was extracted twice with benzene. The combined organic layer and extract was washed with aqueous sodium bicarbonate and distilled. After the benzene and acetonitrile had distilled, the product (2.5 parts) was obtained as a colorless liquid, B. P. 130°–140° C./1 mm.; $n_D^{25}$ 1.4763. It was identified as a coupled product containing two butadiene units and one acetonitrile residue. The other terminal group is the hydroperoxy radical (—OOH) derived from the hydrogen peroxide.

*Analysis.*—Calc'd. for $C_{10}H_{15}NO_2$: C, 66.23; H, 8.34; N, 7.73; mol. wt., 181.2; iodine no., 280.1. Found: C, 61–65 (compound flashed during combustion); H, 7.82, 8.57; N, 9.24; mol. wt., 160; iodine no., 261.

Reduction of the hydroperoxide results in the amino alcohol useful in the preparation of polyester-amides, e. g., the polyester-amide derived from this amino alcohol and adipic acid.

Example IV

To a solution of 750 parts of propionic acid and 49 parts of sulfuric acid in 1500 parts of water, there were added equivalently and simultaneously 108 parts of 1,3-butadiene, a solution of 34 parts of hydrogen peroxide in 130 parts of water, and a solution of 98 parts of sulfuric acid and 278 parts of ferrous sulfate heptahydrate in 575 parts of water. The reactiton mixture was maintained at 5° C. during the eleven minutes required for the addition of the reactants. At the end of the addition, the two layers which comprised the reaction mixture were separated, and the aqueous layer was extracted three times with ether. The ether extract was combined with the organic layer, and the resulting solution was distilled to a pot temperature of 70° C. at 1 mm. pressure. The residue comprised 97.6 parts (a 77% yield based on the hydrogen peroxide employed). The analysis of the product confirmed its identity as a 14-carbon dicarboxylic acid possessing two double bonds.

*Analysis.*—Calc'd. for $C_{14}H_{22}O_4$: C, 66.11; H, 8.72; neut. eq., 127; hydrogenation eq., 127. Found: C, 65.10; H, 8.53; neut. eq., 160; hydrogenation eq., 139.

Example V

The reaction was conducted in the manner described for Example IV except that the initial charge in the reaction vessel included 480 parts of n-butyric acid rather than propionic acid. The dicarboxylic acid obtained as a pale amber, viscous liquid comprised 105.4 parts (75% yield based on the hydrogen peroxide employed).

*Analysis.*—Calc'd. for $C_{16}H_{26}O_4$: C, 68.05; H, 9.28; neut. eq., 141; hydrogenation eq., 141. Found: C, 65.02; H, 8.89; neut. eq., 195; hydrogenation eq., 160.

Example VI

To a mixture of 283 parts of cyclopentanone and 49 parts of sulfuric acid in 2200 parts of water, there were added 1,3-butadiene, hydrogen peroxide, and acidic ferrous sulfate as described in Example IV. The product was isolated by extraction with ether. The ethereal solution of the product was washed twice with aqueous sodium carbonate to remove acidic material and was then distilled. The distillation was continued to a pot temperature of 70° C. at 1 mm. pressure, whereupon a residue of 96.3 parts was obtained (70% yield based on the hydrogen peroxide).

This unsaturated diketone was selectively hydrogenated to the saturated diketone by reduction with hydrogen at room temperature over a palladium catalyst. The resulting product was a diketone consisting of two cyclopentanone residues connected by a saturated 8-carbon chain.

*Analysis.*—Calc'd. for $C_{18}H_{30}O_2$: C, 77.64; H, 10.86; mol. wt., 278; carbonyl eq., 139. Found: C, 76.59; H, 11.13; mol. wt., 284; carbonyl eq., 146.

The unsaturated product obtained as a residue in the above distillation includes the unsaturated ketone designated by the structural formula,

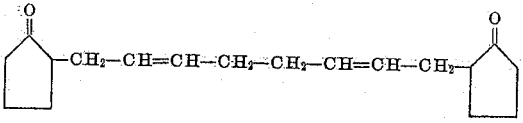

Example VII

The procedure of Example VI was repeated using cyclohexanone in place of the cyclopentanone. The product was isolated by extraction with ether. The distillation of the ether and cyclohexanone to a pot temperature of 145° C. at 0.1 mm. pressure left a residue of 96 parts. The analysis of this dimeric product indicated that it was approximately one-half ketonic and one-half acidic. A 68-part portion of the product was treated with aqueous sodium carbonate and the non-acidic portion extracted with ether. The distillation of the ether left 20 parts of unsaturated diketone. This was selectively hydrogenated over palladium catalyst to yield the saturated diketone. The latter was distilled, B. P., ca., 180° C. at 0.7 mm. pressure. The distillate was the expected 20-carbon diketone.

*Analysis.*—Calc'd. for $C_{20}H_{34}O_2$: C, 78.38; H, 11.18; carbonyl eq., 153. Found: C, 76.97; H, 11.19; carbonyl eq., 192.

The unsaturated product obtained as a residue in the above distillation includes the unsaturated ketone designated by the structural formula,

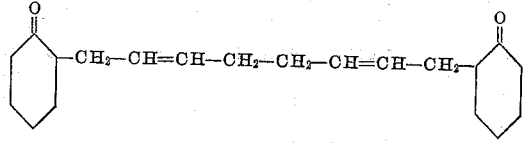

Example VIII

To a mixture of 288 parts of propionitrile, 49 parts of sulfuric acid, and 2000 parts of water, there were added butadiene and solutions of hydrogen peroxide and ferrous sulfate as described in Example IV. The product was isolated by extraction with ether, the extract was washed with aqueous sodium carbonate solution, and the ether and propionitrile distilled to a pot temperature of 80° C. at 1 mm. pressure. The residue comprised 53 parts of a pale amber liquid (a 49% yield based on the hydrogen peroxide employed). The analysis confirmed the identity of this product as a C₁₄ dinitrile containing two double bonds.

*Analysis.*—Calc'd. for $C_{14}H_{20}N_2$: C, 77.73; H, 9.32; N, 12.95; mol. wt., 216; iodine no., 235. Found: C, 73.46; H, 9.34; N, 11.14; mol. wt., 206; iodine no., 227.

The infrared spectrum in the product showed the presence of ethylenic unsaturation and of nitrile groups.

*Example IX*

To a solution of 880 parts of glutaric acid and 49 parts of sulfuric acid in 1500 parts of water, maintained at 25° C., there were added 1,3-butadiene, hydrogen peroxide, and acidic ferrous sulfate as described in Example IV. At the end of the reaction period, the mixture was extracted twice with ether, the ether was distilled, and the residue was subjected to liquid-liquid countercurrent extraction between ether and water. This process separated the product, an unsaturated C₁₈ tetracarboxylic acid, from glutaric acid. From the ethereal fractions, 58 parts of the unsaturated tetracarboxylic acid was obtained.

*Analysis.*—Calc'd. for $C_{18}H_{26}O_8$: C, 58.36; H, 7.08; neut. eq., 92.6; hydrogenation eq., 185.2. Found: C, 58.45; H, 7.47; neut. eq., 106.0; hydrogenation eq., 197.6.

*Example X*

To a mixture of 695 parts of methyl acetate, 49 parts of sulfuric acid, and 800 parts of water, there were added 1,3-butadiene, hydrogen peroxide, and ferrous sulfate as described in Example IV. The product was isolated by extraction with ether. The extract was washed with excess sodium carbonate and the ether and methyl acetate distilled to a pot temperature of 105° C. at 1 mm. pressure. The product, an unsaturated C₁₄ diester, comprised 42.3 parts.

*Analysis.*—Calc'd. for $C_{14}H_{22}O_4$: C, 66.11; H, 8.72; sap. eq., 127.2; mol. wt., 254.3. Found: C, 65.83; H, 8.84; sap. eq., 152.1; mol. wt., 296.

*Example XI*

To a solution of 490 parts of sulfuric acid, 500 parts of cyclohexylamine, and 2000 parts of water, there were added 1,3-butadiene, hydrogen peroxide, and ferrous sulfate as described in Example IV At the end of the addition period, a concentrated aqueous solution containing 343 parts of sodium hydroxide was added. The resulting mixture had a pH of 5.0. The ferric oxide which precipitated was removed by filtration and then digested with 2000 parts of boiling water to extract amine salts. This extract was added to the original aqueous phase and the resulting solution was concentrated until salts precipitated. These were removed by filtration and the concentration was continued. A solution containing 200 parts of sodium hydroxide was added, whereupon an organic layer separated. The salts which had been removed by filtration were similarly treated with alkali and the organic phase resulting was combined with that obtained above. The amine mixture was dried over solid potassium hydroxide and distilled under reduced pressure. The distillation was conducted to a pot temperature of 160° C. at 0.4 mm. pressure, whereupon a residue of 76 parts was obtained. This material is an unsaturated diamine consisting of two cyclohexylamine residues and two butadiene units.

*Analysis.*—Calc'd. for $C_{20}H_{36}N_2$: C, 78.88; H, 11.91; N, 9.20; mol. wt., 304; neut. eq., 152. Found: C, 75.96; H, 11.63; N, 9.23; mol. wt., 353; neut. eq., 157.

*Example XII*

To a solution of 49 parts of sulfuric acid and 655 parts of acetaldehyde in 1500 parts of water, there were added 1,3-butadiene, hydrogen peroxide, and ferrous sulfate as described in Example IV. The product was extracted with ether and the extract washed with aqueous sodium carbonate solution. The distillation of the extract to a pot temperature of 80° C. at 1 mm. pressure gave an unsaturated dialdehyde as a still residue comprising 6.5 parts.

*Analysis.*—Calc'd. for $C_{12}H_{18}O_2$: C, 74.19; H, 9.34; carbonyl eq., 97.1; mol. wt., 194.3. Found: C, 72.89; H, 9.84; carbonyl eq., 124.2; mol. wt., 195.0.

The examples illustrate the use of saturated compounds (i. e., those free from carbon-to-carbon unsaturation) in which there is a functional group containing a polyvalent element and more specifically carbonyl compounds (including aldehydes and ketones), carboxyl compounds (including acids and esters), cyano and amino compounds. These compounds which contain the above functional, or negative, groups have at least two carbons and a plurality of hydrogen atoms attached to carbon.

Reference in the specification and claims to parts, proportions and percentages, unless otherwise specified, refers to parts, proportions and percentages by weight.

Since it is obvious that many changes and modifications can be made in the above-described details without departing from the nature and spirit of the invention, it is to be understood that the invention is not to be limited to said details except as set forth in the appended claims.

I claim:

1. A process for the additive coupling of polymerizable ethylenically unsaturated compounds which comprises reacting, at a temperature not exceeding 60° C., a polymerizable diene having four to five carbon atoms with hydroxyl free-radical in a molar ratio of said diene to hydroxyl free-radical of between 1:1.5 and 5:1 in the presence of water and a reactive organic solvent having a solubility in water of at least 3% and that is a monofunctional compound free from carbon-to-carbon unsaturation and containing a functional group taken from the class consisting of carbonyl, cyano, carboxyl, and amino groups.

2. A process for the additive coupling of polymerizable ethylenically unsaturated compounds which comprises reacting, at a temperature not exceeding 60° C., 1,3-butadiene with hydroxyl free-radial in a molar ratio of said butadinee to hydroxyl free-radical of between 1:1.5 and 5:1 in the presence of water and a reactive organic solvent having a solubility in water of at least 3% and that is a monofunctional compound free from carbon-to-carbon unsaturation and containing a functional group taken from the class consisting of carbonyl, cyano, carboxyl, and amino groups.

3. A process for the additive coupling of polymerizable ethylenically unsaturated compounds which comprises reacting, at a temperature not exceeding 60° C., 1,3-butadiene with hydroxyl free-radical in a molar ratio of said butadiene to hydroxyl free-radical of between 1:1.5 and 5:1 in the presence of water and a compound, free from carbon-to-carbon unsaturation, containing two to six carbon atoms and a cyano group.

4. A process for the additive coupling of polymerizable ethylenically unsaturated compounds which comprises reacting, at a temperature not exceeding 60° C., 1,3-butadiene with hydroxyl free-radical in a molar ratio of said butadiene to hydroxyl free-radical of between 1:1.5 and 5:1 in the presence of water and a compound, free from carbon-to-carbon unsaturation, containing two to six carbon atoms and a carboxyl group.

5. A process for the additive coupling of polymerizable ethylenically unsaturated compounds which comprises reacting, at a temperature not exceeding 60° C., 1,3-butadiene with hydroxyl free-radical in a molar ratio of said butadinee to hydroxyl free-radical of between 1:1.5 to 5:1 in the presence of water and a compound, free from carbon-to-carbon unsaturation, containing two to six carbon atoms and an amino group.

6. A process for the additive coupling of polymerizable ethylenically unsaturated compounds which comprises reacting, at a temperature not exceeding 60° C., 1,3-butadiene with hydroxyl free-radical in a molar ratio of said butadiene to hydroxyl free-radical of between 1:1.5 and 5:1 in the presence of water and a compound, free from carbon-to-carbon unsaturation, containing two to six carbon atoms and a keto group.

7. A process for the additive coupling of polymerizable ethylenically unsaturated compounds which comprises reacting, at a temperature not exceeding 60 C., 1,3-butadiene with hydroxyl free-radical in a molar ratio of said butadiene to hydroxyl free-radical of between 1:1.5 and 5:1 in the presence of water and a monofunctional compound, free from carbon-to-carbon unsaturation, containing two to six carbon atoms and a carbonyl group.

8. The new chemical compounds represented by the formula $$R-(C_4H_6)-(C_4H_6)-R$$

wherein R is a monovalent radical of an esocyclic ketone having five to six atoms in the ring and consisting of hydrogen and carbon atoms except for the keto group, and wherein the $(C_4H_6)$ units are taken from the group consisting of

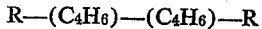

and

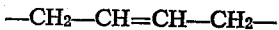

9. The new chemical compound represented by the formula:

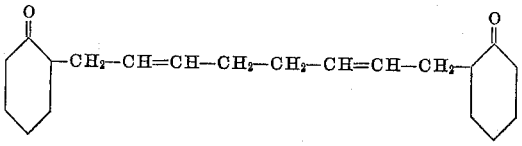

10. The new chemical compound represented by the formula:

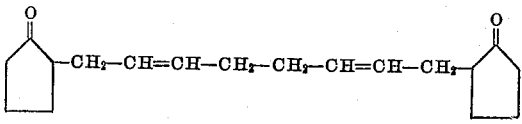

References Cited in the file of this patent

UNITED STATES PATENTS

| | | |
|---|---|---|
| 2,432,287 | Cramer | Dec. 9, 1947 |
| 2,433,015 | Roland et al. | Dec. 23, 1947 |
| 2,552,980 | Ladd et al. | May 15, 1951 |